Patented Apr. 23, 1929.

1,710,227

UNITED STATES PATENT OFFICE.

JOHN LOUIS LANGE, OF DUMONT, NEW JERSEY.

COMPOUND FOR PREVENTING CORROSION OF STORAGE-BATTERY-TERMINAL CONNECTERS.

No Drawing.   Application filed August 9, 1927. Serial No. 211,858.

The object of this invention is to provide a compound, in the form of a paste, adapted to be applied to the terminals and connecters of a storage battery to prevent corrosion of the terminal connecters.

The terminal connecters of a storage battery cable, and more especially the positive terminal connecters are seriously corroded by reason of the contact therewith of the dilute sulphuric acid from within the battery. It is almost impossible to prevent the diluted sulphuric acid reaching the terminal connecters of the battery. Sometimes there is a leakage up through the terminal connection; sometimes the acid is accidentally spilled on the top of the battery; and sometimes it is blown out in the form of mist by the gases generated within the battery during the charging operation. When acid is in contact with the terminal connecters outside of the battery a secondary electrolytic action is established with the acid and water acting as the electrolyte. There is also a sulphation due to the oxygen coming in contact with the acid, and the resulting chemical action. The result is a severe corrosion of the terminal connecter which is detrimental to the operation of the battery and, if not prevented, eventually destroys the positive terminal connecter.

The compound consists of a base formed of any suitable miscible paste of any heavy oil or petroleum product. With this paste material I mix dried sodium carbonate and ammonium sulphate. I preferably use approximately 88% of dried sodium carbonate and approximately 12% of ammonium sulphate. This dry material is mixed with a sufficient body of the paste material to make a paste of such consistency that it may be readily applied to the terminals and will have sufficient body to form a substantial self sustaining coating thereon.

The dried sodium carbonate neutralizes the sulphuric acid and changes it to sodium sulphate and thereby destroys or transforms the sulphuric acid and prevents the secondary electrolytic action. This prevents the corrosion of the terminal connecter. The ammonium sulphate is soluble in sulphuric acid and serves as a means for keeping the terminal and connecter clean and preventing any rust or corrosion due to the undecomposed water and the sodium sulphate. I have found that battery terminal connecters coated with a compound made up as described remain clean for a long period. The compound is not in any way affected by the current from the battery or the charging current. The amount of dried sodium carbonate of the compound is sufficient to neutralize or transform a considerable amount of sulphuric acid so that it will remain active over a considerable period.

What I claim is:

1. A compound for preventing corrosion of storage battery terminal connecters, comprising a miscible base, dried sodium carbonate and ammonium sulphate.

2. A compound for preventing corrosion of storage battery terminal connecters, comprising a miscible base, dried sodium carbonate 88 per cent and ammonium sulphate 12 per cent.

In testimony whereof I hereunto affix my signature.

JOHN LOUIS LANGE.